United States Patent [19]
Osborne et al.

[11] Patent Number: 6,073,431
[45] Date of Patent: Jun. 13, 2000

[54] SELF-PROPELLED WINDROWER

[75] Inventors: Donald L. Osborne, Quarryville; Cecil R. Sudbrack, New Holland; Robert L. Rice, New Holland; Kenneth W. McLean, New Holland; Philip J. Ehrhart, Narvon, all of Pa.

[73] Assignee: New Holland North America, Inc., New Holland, Pa.

[21] Appl. No.: 09/216,219

[22] Filed: Dec. 18, 1998

Related U.S. Application Data

[60] Provisional application No. 60/068,947, Dec. 29, 1997.

[51] Int. Cl.[7] ............................. A01D 34/03; A01D 61/00
[52] U.S. Cl. .................... 56/15.7; 56/16.4 A; 56/DIG. 9; 56/DIG. 14
[58] Field of Search .................................. 56/15.2, 15.5, 56/15.7, 15.9, DIG. 9, 192, 16.4 A, 16.4 B, 16.4 C, 14.3, 14.5, 14.6, DIG. 14

[56] References Cited

U.S. PATENT DOCUMENTS

| | | | |
|---|---|---|---|
| 3,293,835 | 12/1966 | Gehman et al. | 56/16.4 B |
| 3,521,433 | 7/1970 | Wright et al. | 56/16.4 D |
| 4,473,993 | 10/1984 | Jennings et al. | 56/208 |
| 4,558,560 | 12/1985 | Koch | 56/228 |
| 4,905,462 | 3/1990 | Hurlburt | 56/15.9 |
| 4,993,216 | 2/1991 | Covington et al. | 56/15.9 |
| 5,327,709 | 7/1994 | Webb | 56/15.8 |
| 5,863,005 | 1/1999 | Bramstedt et al. | 241/101.742 |
| 5,867,970 | 2/1999 | Ehrhart et al. | 56/6 |
| 5,943,848 | 8/1999 | Rice et al. | 56/16.4 B |
| 5,976,012 | 11/1999 | Naaktgeboren et al. | 460/113 |

FOREIGN PATENT DOCUMENTS

WO 81/02966  10/1981  United Kingdom .

*Primary Examiner*—Thomas B. Will
*Assistant Examiner*—Meredith C. Petravick
*Attorney, Agent, or Firm*—J. William Stader; Frank A. Seemar; Larry W. Miller

[57] ABSTRACT

The invention relates to an improvement to the header of an agricultural self-propelled windrower. The invention has a conditioner assembly and mower assembly that can be separated and removed. Hook and pin combination and a conditioner mounting bolt attach the conditioner assembly. A free link and bell crank allow the flotation springs to remain attached with the header is removed. A header top link can be attached to a bracket on either the conditioner or mower assemblies to assist in moving the header. There is a header lift manifold that moves a restricted flow control valve by a switch-actuated solenoid. When the solenoid is activated, the valve moves and forces hydraulic fluid through an orifice. This allows the header limited movement.

19 Claims, 14 Drawing Sheets

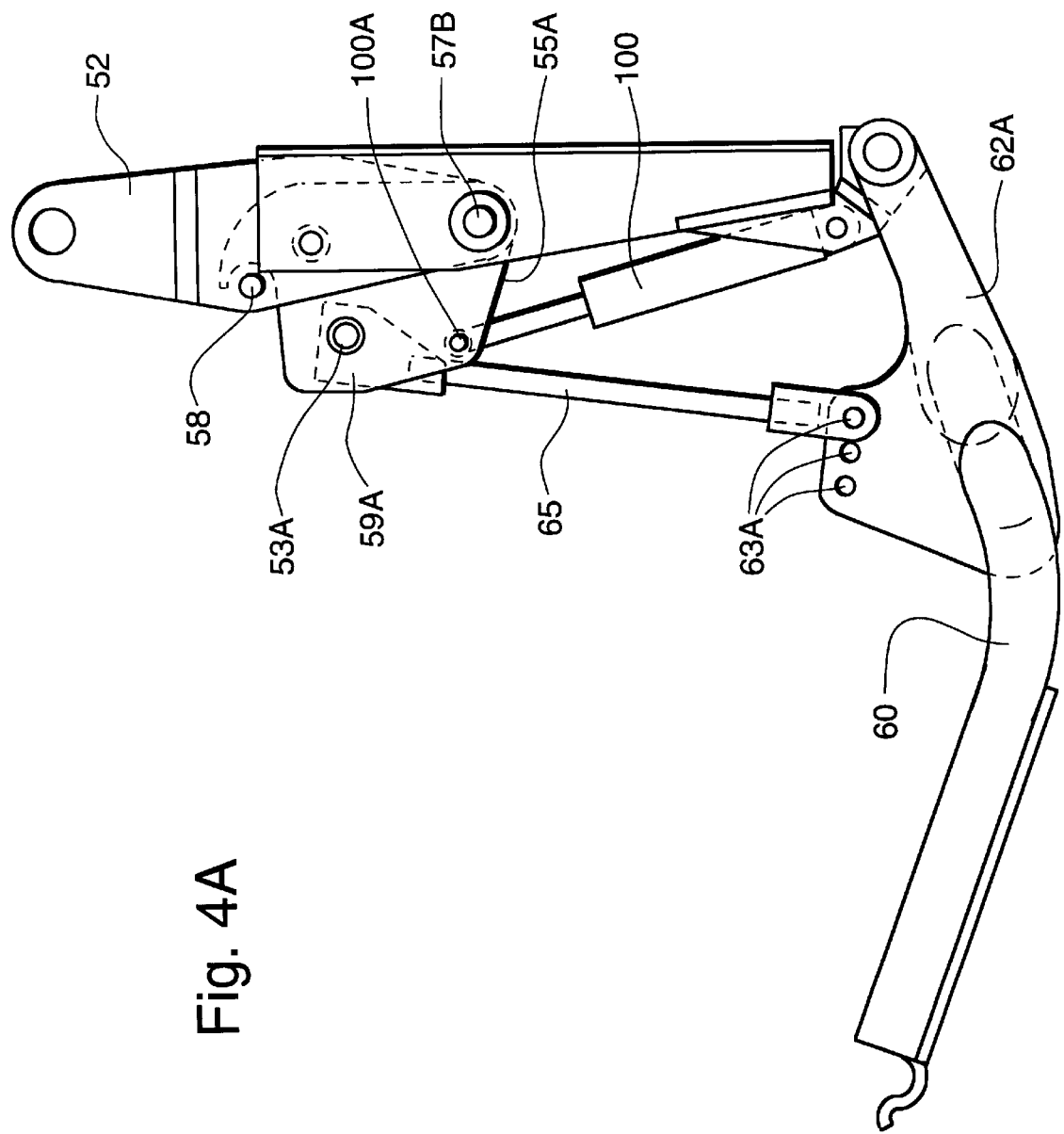

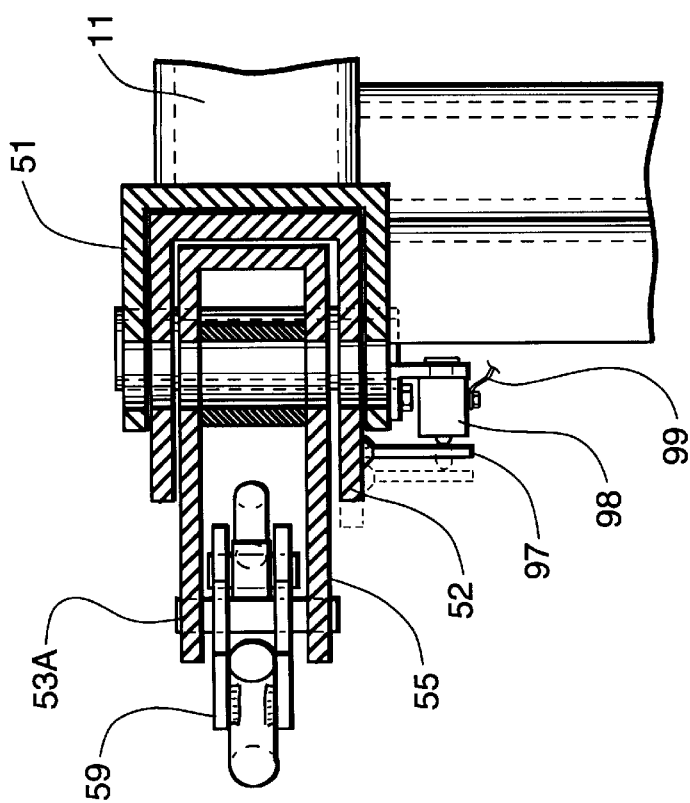
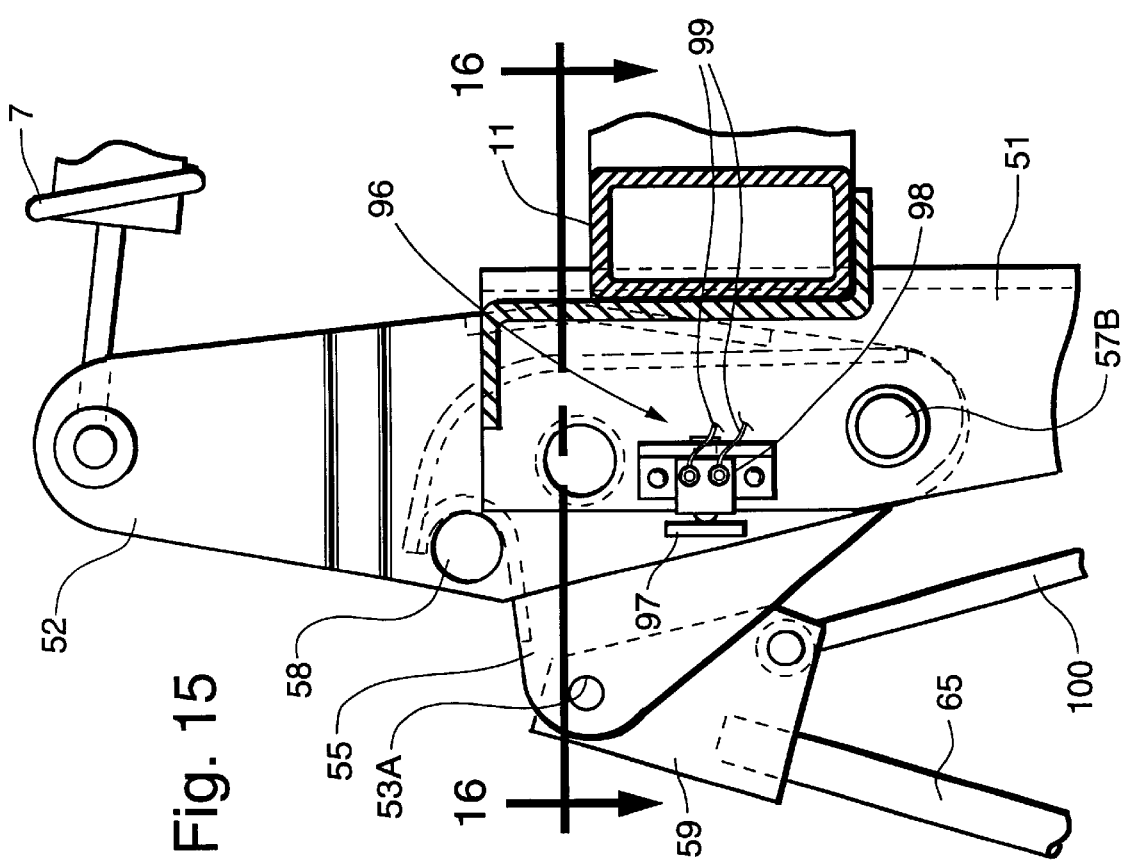

SELF-PROPELLED WINDROWER

CROSS-REFERENCE TO RELATED APPLICATIONS

This application claims domestic priority on U.S. Provisional Patent Application Ser. No. 60/068,947, filed on Dec. 29, 1997.

BACKGROUND OF INVENTION

1. Field of Art

This invention relates to the improvement of an agricultural harvesting machine. More specifically it relates to an improvement of the self-propelled windrower and the header attached thereon. The specific improvements include several improvements for attaching and removing the header.

2. Description of Prior Art

Self-propelled windrowers have been used in farming operations for decades. The self-propelled windrower is designed to cut and process hay or other crops. If desired, the processed crop can be placed in a windrow for drying and later processing. Most self-propelled windrowers have a header that receives and processes the crop. The windrower typically has an engine for moving the windrower and powering the header. Behind the header, but at the front of the windrower, is located a glass-enclosed cab. An operator controls the windrower and header from the cab. Most headers consist of a protective screen covering a cutting means. The cutting means can consist of a sickle bar or rotary disc mower. Such cutting means are well known and well described in the prior art. If desired, the cut crop can be conditioned or ejected from the header. The stem portion of a conditioned crop is usually crimped so as to allow the moisture in the stem to escaped. If conditioned crops are desired, the crops are passed through a pair a rubber covered conditioning rolls. The ejected crop is arranged onto a windrow to aid in drying. These methods are well known and described in the prior art. The processed crop is left on the field for future processing—usually a baling mechanism of some type.

The header is controlled by several means, one of which is a pair of flotation springs positioned on either side of the cab. The flotation springs ensure that a sufficient amount of pressure is maintained between the header and the ground. Too much pressure results in the header hitting the ground and excessive skid shoe wear, while too little pressure results in the header constantly moving. Typically, there is a pair of hydraulically actuated lift cylinders. The lift cylinders raise and lower the entire header. There is typically a tilt cylinder that tilts the cutting means at the front portion of the header either away or towards the ground. The header is usually powered either hydraulically, mechanically or a by a combination of these two.

The prior art illustrates several difficulties with current self-propelled windrower design. Presently, it is very difficult to install and remove the header from a self-propelled windrower. Typically, the flotation springs are disconnected from the header. Once the flotation springs are disconnected, the header quickly falls to the ground. It is difficult, dangerous and very time consuming to re-attach the springs. It would also be cost savings if the conditioning portion of the mower conditioner could be removed to allow an operator to just mow the crop. Typically, headers are designed for either mowing or mowing and conditioning. Under the prior art, it could be quite difficult to remove or disengage the conditioning rolls. If a single individual, while working in the field, could remove or re-install the conditioner assembly it would generate a time and cost-savings to a farmer.

Consequently, the need exists for a header on which the conditioner assembly can be safely and easily removed by a single individual while in the field. It would be a further advantage if these attachment mechanisms for the conditioner assembly could be achieved without the use of a complex tools and equipment.

OBJECTS OF THE INVENTION

It is an object of the present invention to provide an improvement to the header of a self-propelled agricultural windrower.

It is a further object of the present invention to provide a conditioner assembly that can be removed or attached to a mower assembly on a self-propelled windrower.

It is a further object of the present invention to provide a header removal linkage for a self-propelled windrower tractor frame.

It is a further object of the present invention to provide a floating top link assembly for a a self-propelled windrower tractor.

It is a further object of the present invention to provide a header lift orifice for controlling the movement of the header on a self-propelled windrower.

It is a further object of the present invention to provide a method of removing the conditioner assembly from the mower assembly on a self-propelled windrower.

It is a further object of the present invention to provide a method of storing the tilt cylinder for controlling the header of a self-propelled windrower.

It is a further object of the present invention to provide a header removal linkage that does not require the operator to remove the flotation springs controlling the header of a self-propelled windrower.

It is a further object of the present invention to provide a header lift orifice that prevents the header from dropping rapidly to the ground after the flotation springs are disconnected.

SUMMARY OF THE INVENTION

The invention overcomes the deficiencies of the prior art. The invention is an improvement to the header of a self-propelled agricultural windrower. The improvement consists of mower assembly and conditioner assembly which may be separated and removed by a single person and requiring a minimum of time and tools. The invention consists of a conditioner assembly attached to a mower is assembly by a conditioner mounting bolt and a conditioner hook attached to a mower pivot. The lift arms lift the mower lift pin or when the conditioner is being removed, the conditioner removal pin. There is a conditioner bracket and mower bracket on each assembly that attaches to the header top link. To obviate the need for disconnecting the flotation springs, there is a bell crank pivotally attached to a free link. During normal farming operations, the bell crank and free link pivot act as a single member. However, when removing the conditioner assembly, a lockout pin is removed and the bell crank moves independently of the free link and flotation springs. There is also a frame mounting bracket positioned at the center of the self propelled tractor frame allowing the tilt cylinder to be stowed or re-attached to the header. The tilt cylinder is pivotally and slideably attached to the frame mounting bracket through an arcuate slot. A series of tractor pin slots allow the tilt cylinder to achieve a variety of positions needed to attach, detach or re-attach the tilt cylinder to the header. There is also a header lift manifold that has a switch controlling a solenoid on a two position valve. The switch stays closed when the free link separates from the frame bracket. This keeps the solenoid valve energized and the restricted flow control valve closed so as to prevent hydraulic fluid from passing through the valve. The fluid is forced through an orifice. This prevents the header from rapidly dropping, but the header still has some motion.

BRIEF DESCRIPTION OF THE DRAWINGS

The advantages of this invention will be apparent upon consideration of the following detailed disclosure of the invention, especially when taken in conjunction with the accompanying drawings wherein:

FIG. 4A is enlarge fragmentary view of the a portion of FIG. 2 shows a preferred embodiment of the header removal linkage. The mower and conditioner assemblies are not shown.

FIG. 15 is an enlarged detail sectional view taken on the line 15—15 of FIG. 1. This view shows the relationship of the free link, bell crank and switch that operates to restrict header lift hydraulic fluid when the free link is fully back.

FIG. 16 is a sectional view taken on the line 16—16 of FIG. 15 showing another view of the switch—free link relationship. This sectional also passes through all the aligned holes in the frame bracket, the free link and bell crank which receives the lockout pin to lock the parts in the transport or service safety position.

DETAILED DESCRIPTION OF THE INVENTION

Figure 1:
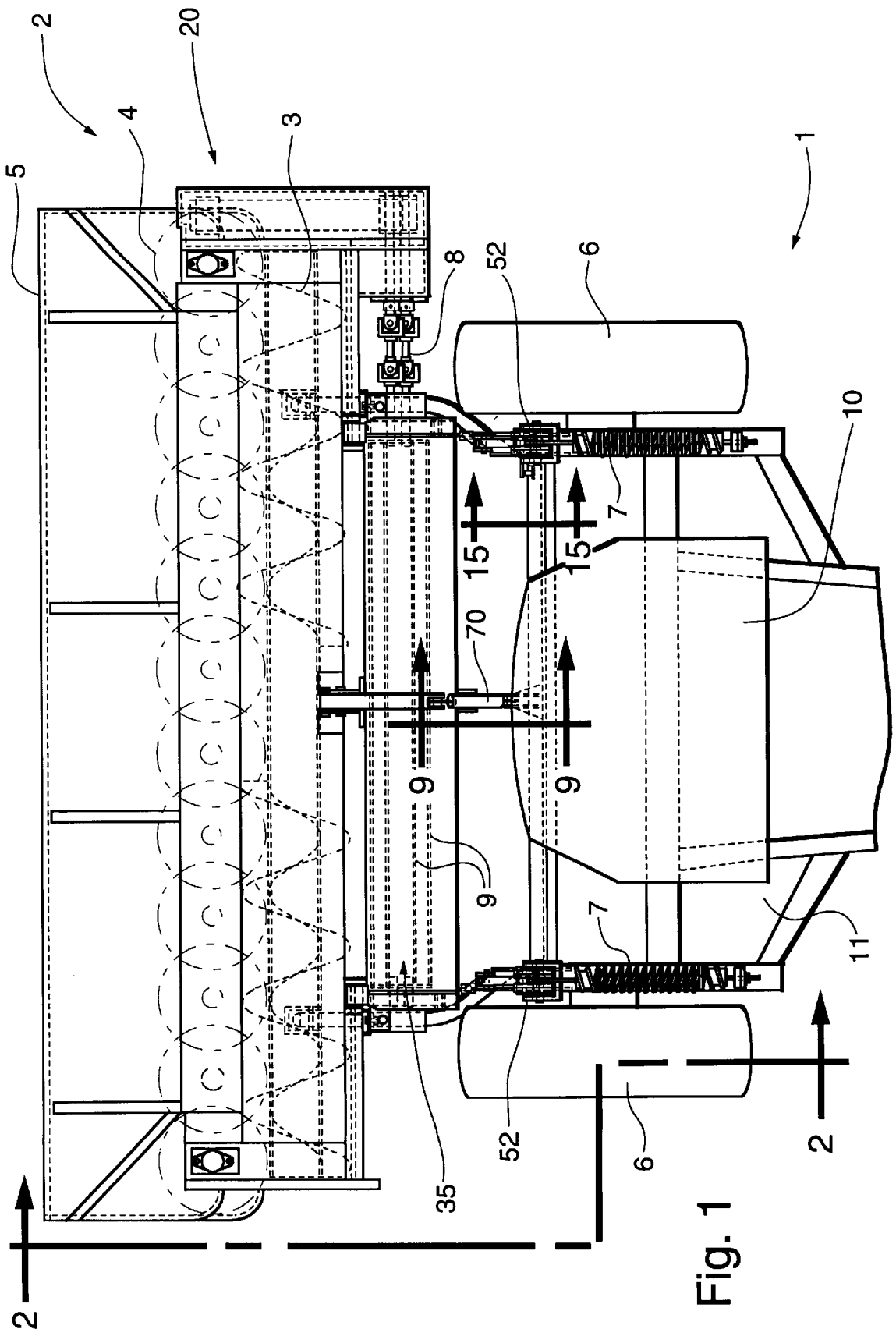
FIG. 1 is a top plan view of the front half of a self-propelled windrower, particularly the header. The header is raised and the flotation springs are contracted.

Referring to the drawings, it is possible to observe the major elements and general operation of the present invention. Left and right references are used as a matter of convenience and are determined by standing at the rear of the windrower and facing the forward end in the normal direction of travel. Likewise, forward and rearward are determined by normal direction of travel of the windrower. Upward or downward orientations are relative to the ground or operating surface. Horizontal or vertical planes are also relative to ground.

Figure 2:
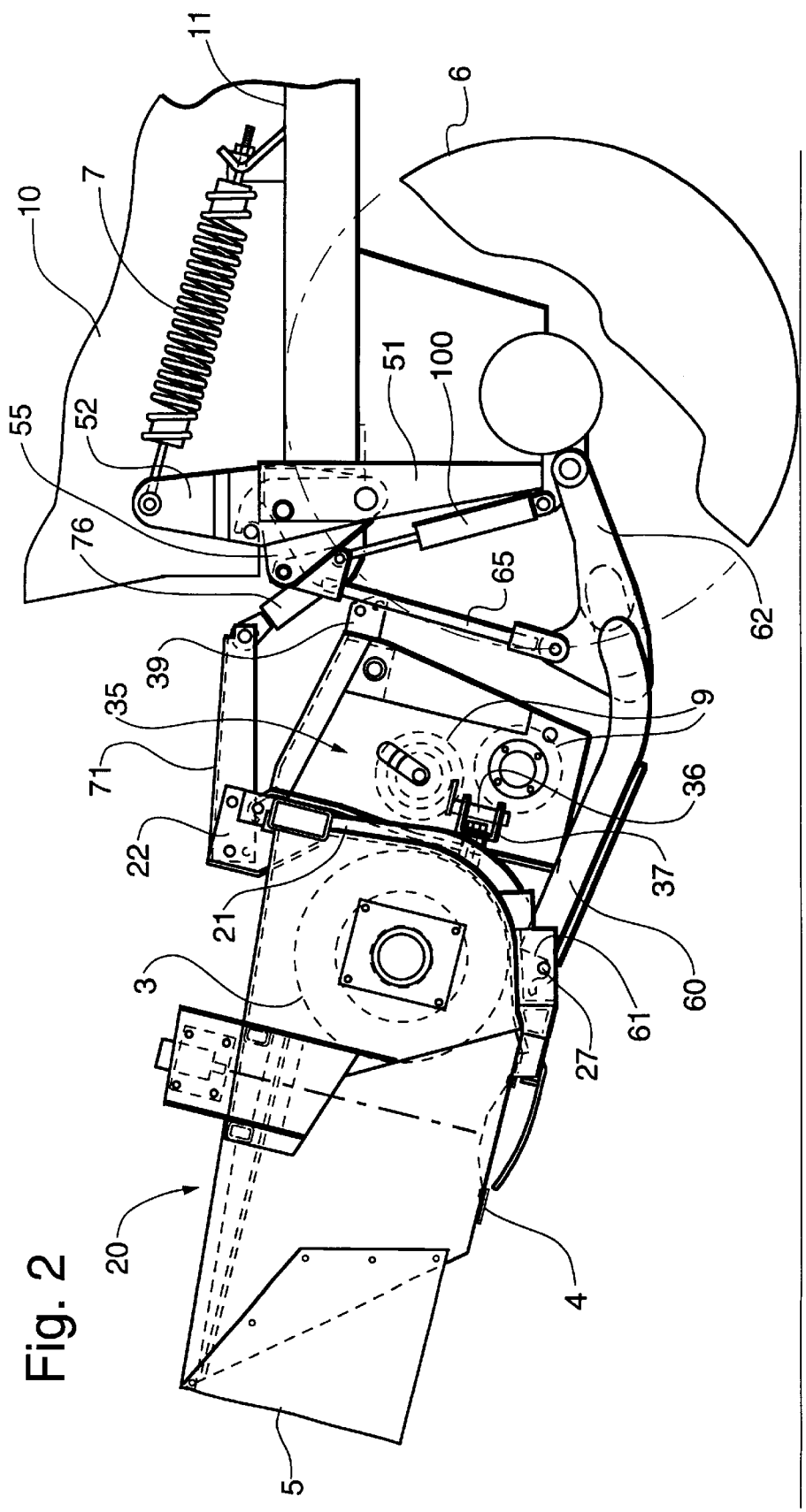
FIG. 2 is a side elevational view of the structure of FIG. 1 taken on the line 2—2 of FIG. 1. The lift cylinder is extended and the flotation springs are contracted.
Figure 3:
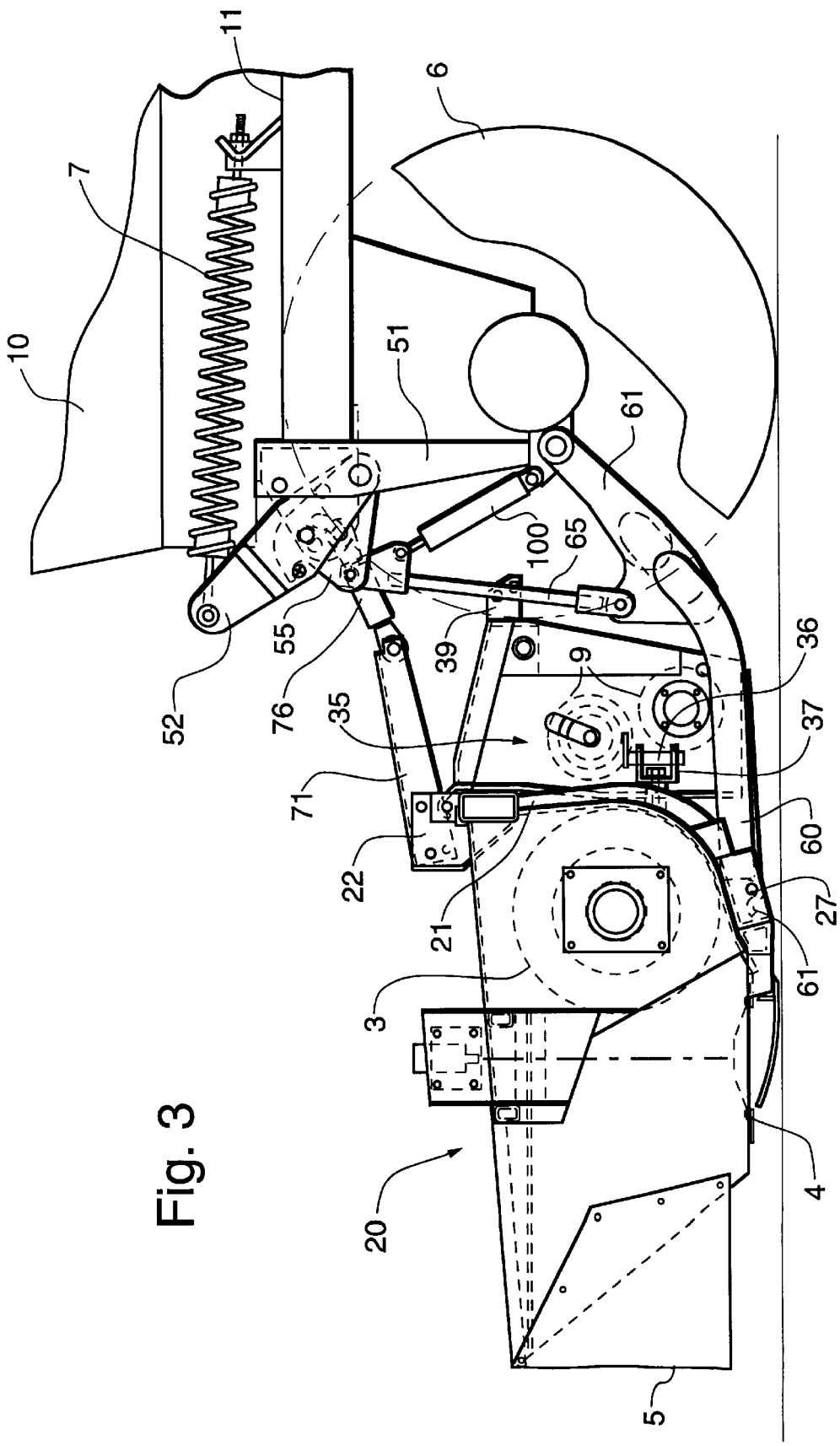
FIG. 3 is a view similar to FIG. 2, but with the header lowered to operating position. The free link and bell crank are locked together and the flotation springs are extended and lift cylinder is contracted.

FIG. 1 illustrates a conventional self-propelled agricultural windrower 1, focusing on the forward portion of the unit. Usually, the windrower or tractor portion pushes a header 2. The windrower or tractor has a set of front wheels 6 and a pair of rear wheels (not shown). There is a glass-enclosed cab 10 where the operator controls the windrower 1 and header. Partially surrounding the cab 10 is a platform 11. The header 2 is position at the front of the windrower. Basically, the header 2 has a cutting means. In FIG. 2, the cutting means are a series of counter-rotating discs 4. However, a sickle bar could be substituted for the cutting means. The crop is cut by the discs 4 and falls rearward. An auger 3 moves the crop to the center of the header. If the crop is just being mowed, the crop is then ejected. A pair of shields (not shown) are used to arrange the crop into a windrow. If conditioned crops are desired, the crop is passed through a pair of conditioning rolls 9 inside a conditioner assembly 35. A pair of splined header drive shafts 8 drives the conditioning rolls. These are driven by a conventional hydraulic pump/motor configuration. The shafts 8 may be easily disconnected or connected by the splined connection. Such splined drive shafts are common in the farming industry. The header 2 is controlled by several mechanisms. There are a pair of flotation springs 7 on either side of the cab which control the height of the header 2 from the ground. There are also a pair of lift cylinders (not visible) located near the header removal linkage 2. The lift cylinders also control the height of the header 2 relative to the ground. Near the floating top link assembly 70 is a tilt cylinder that can tilt the header and the cutting discs away or towards the ground. Also at the front of header 2 is a protective screen 5 to prevent cut debris from flying and injuring anyone.

Figure 5:
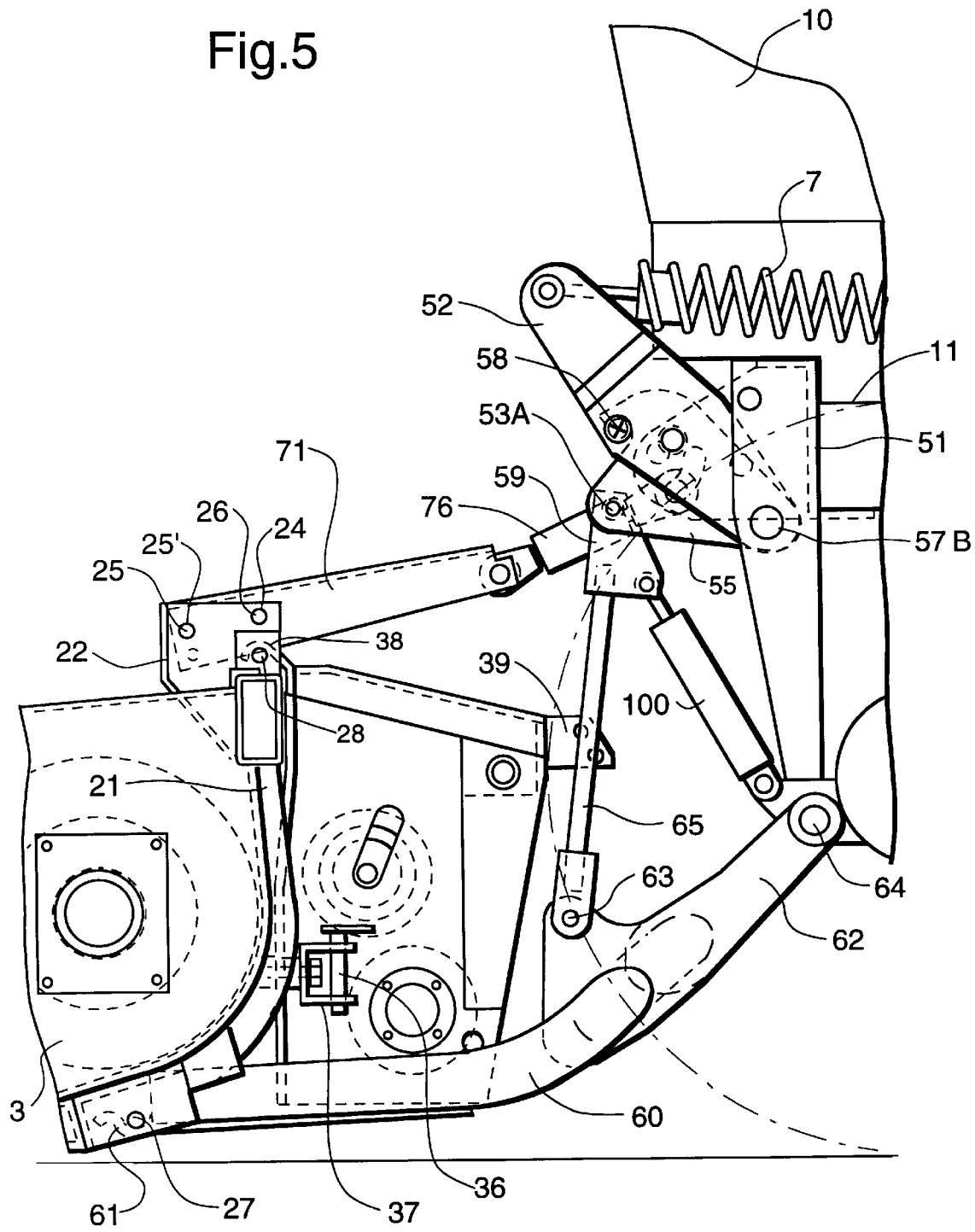
FIG. 5 is a fragmentary enlargement of FIG. 3 that better shows the individual components because of the larger scale.
Figure 6:
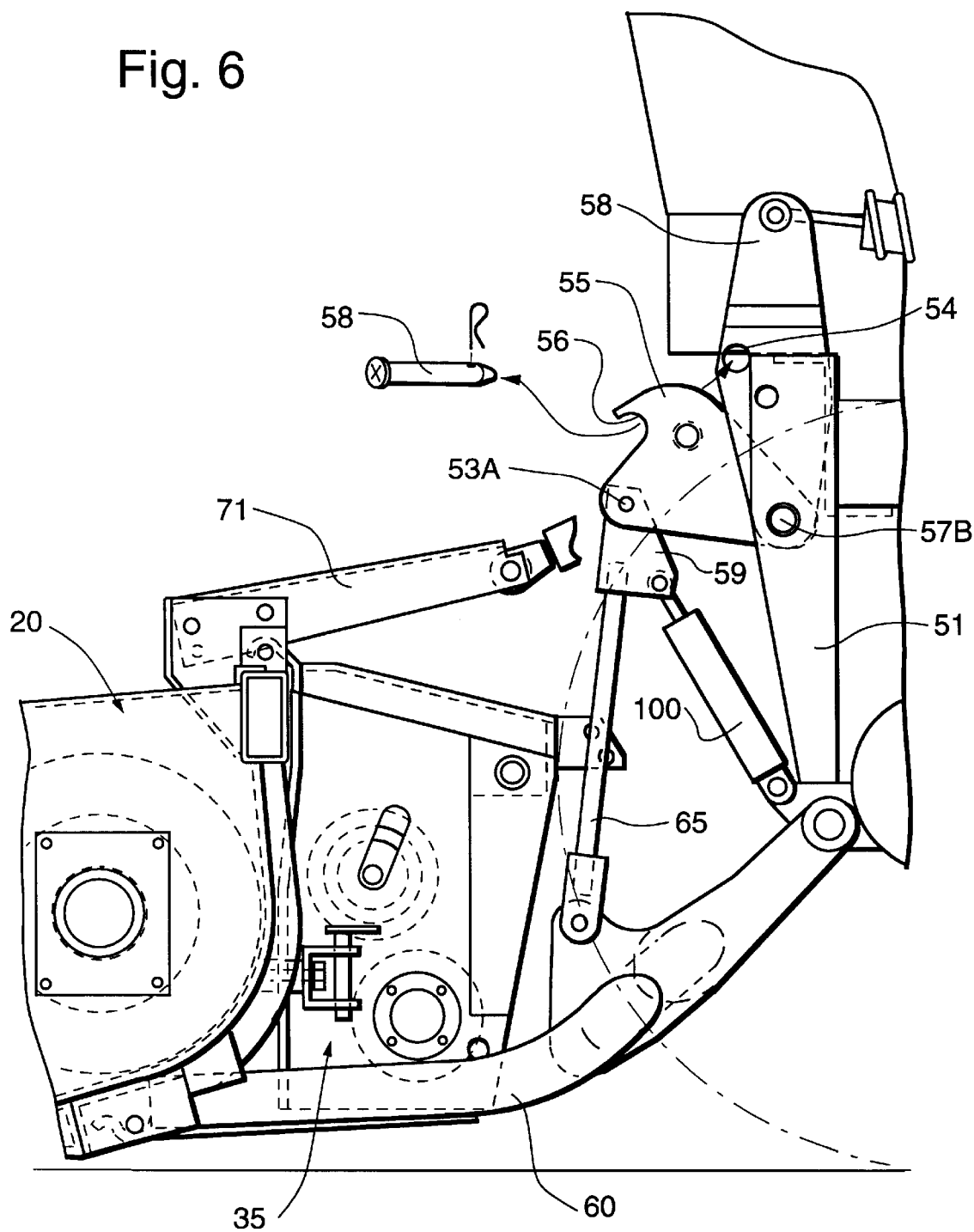
FIG. 6 is a side elevational view showing the header and conditioner lowered to the ground from the FIG. 4 position after the lockout pin connecting the bell crank and free link has been removed. The free link is up and back and the lift cylinder is contracted to let the bell crank lower the header without the use of the counter-balancing springs.
Figure 7:
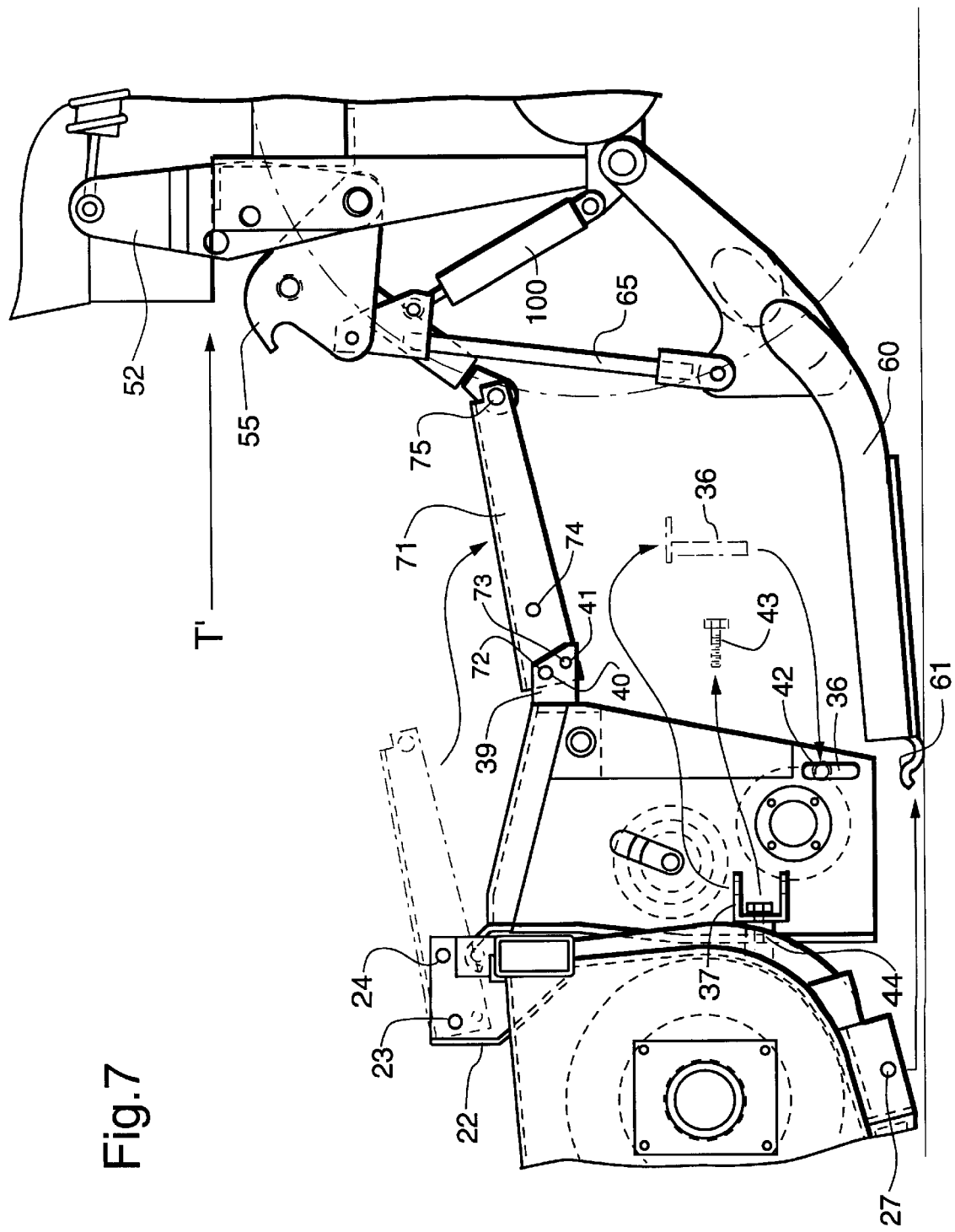
FIG. 7 is a schematic side elevation showing preparation for removing the conditioner. Specifically, the lift arm is lowered from the mower lift pin and backed off to the conditioner removal pin socket location. The conditioner removal pin has been removed from its carrying bracket and inserted in the conditioner removal pin socket. The conditioner mounting bolt has been removed. The header top link has been unpinned and attached to the conditioner bracket.
Figure 8:
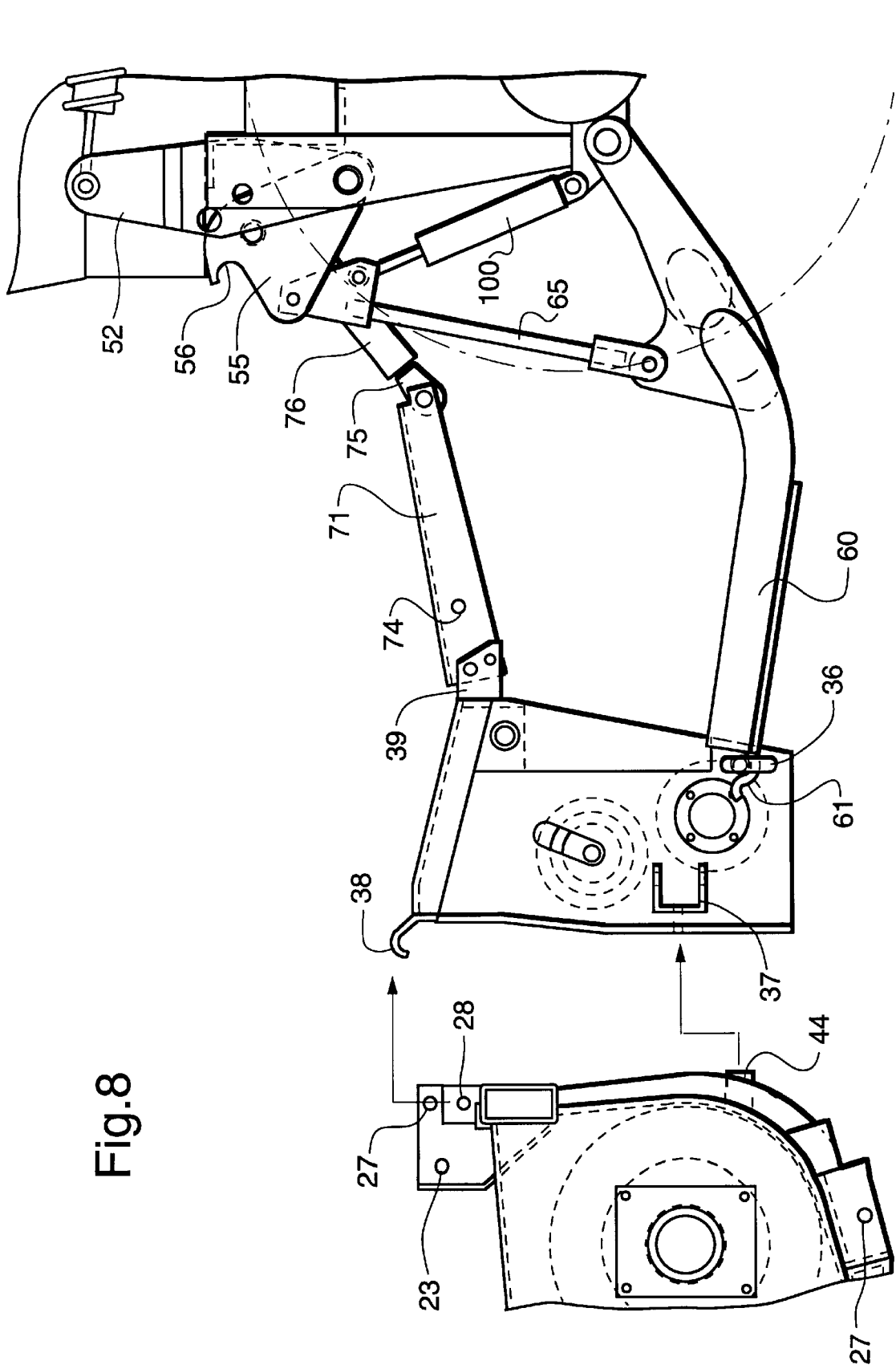
FIG. 8 is a schematic side elevation of the next step in the conditioner removal operation. The lift arm has been raised by the lift cylinder to engage the condition removal pin. The conditioner has been further elevated to disengage the conditioner hooks and the tractor has backed away to separate the conditioner assembly from the rest of the header.
Figure 9:
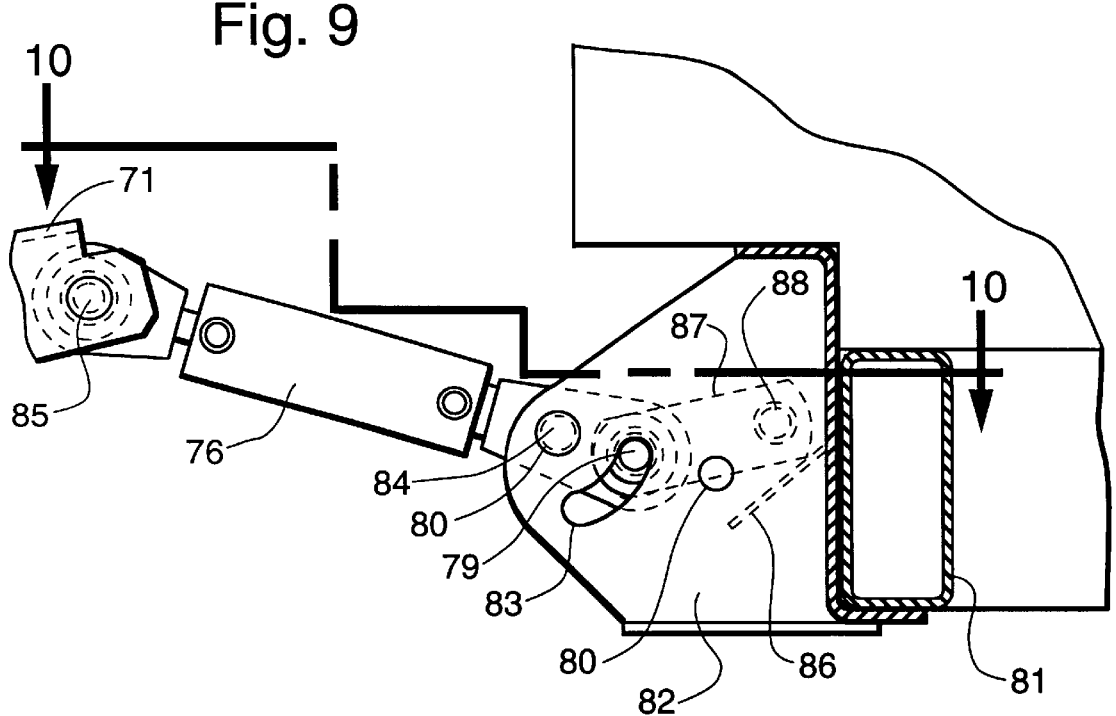
FIG. 9 is an enlarged detailed sectional view taken on the line 9—9 of FIG. 1 showing the tilt cylinder and its attaching structure between the header top link and the tractor frame mounting bracket.
Figure 10:
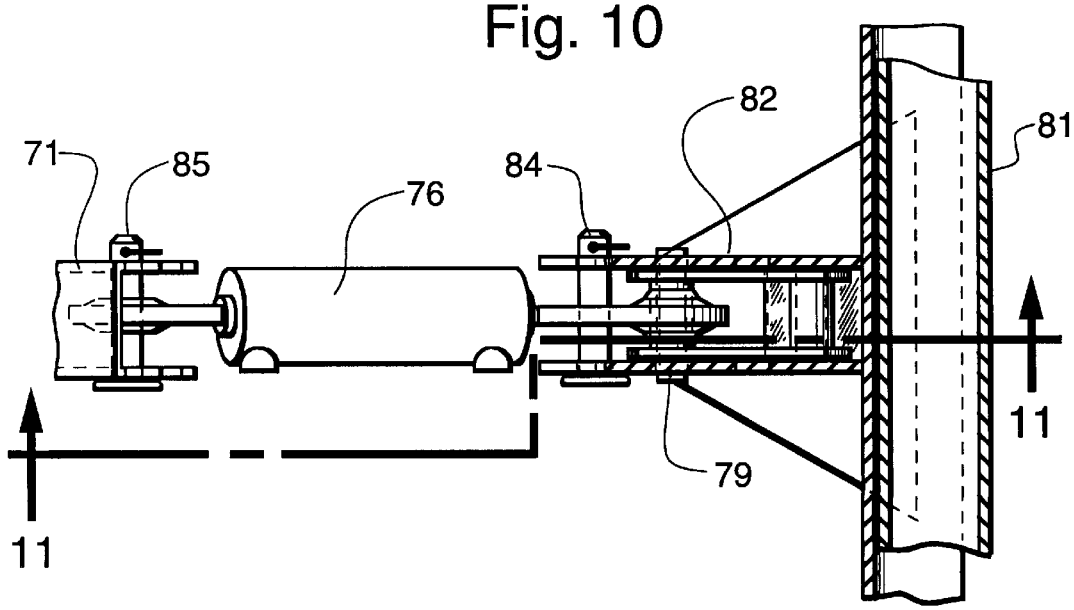
FIG. 10 is a sectional view taken on the line 10—10 of FIG. 9 showing the floating top link assembly within the frame attachment bracket.

FIG. 2 illustrates a side view of the mower assembly 20, conditioner assembly 35 and the header removal linkage 50. The mower assembly 20 consists of a curved mower frame 21, the previously discussed protective screen 5, cutting discs 4 and auger 3. Attached at the top of the frame is the mower bracket 22. Also near the top of the mower frame 21 is the mower pivot 28. In the mower bracket 22, there is the first mower socket 23 and second mower socket 24. At the base of the mower frame 21 is the mower lift pin 27. As seen in FIGS. 2 through 7, the conditioner assembly 35 positioned behind the mower assembly 20. The conditioner assembly consists of a pair of conditioning rolls 9. There is also a conditioning bracket 39 having a first conditioner socket 40 and second conditioner socket 41. There is also a conditioner hook 38 that contacts the mower pivot 28. At the front of the conditioner assembly is the conditioner pin carrying bracket 37. As seen in FIG. 2, the bracket 37 is holding the conditioner removal pin 36. As seen in FIG. 7, the conditioner removal pin 36 can be removed from the conditioner pin carrying bracket 37 and inserted into the conditioner pin socket 42. The conditioner mounting bolt 43 can be removed from the conditioner mounting socket 44 (which is actually in the mower frame 21).

Figure 4:
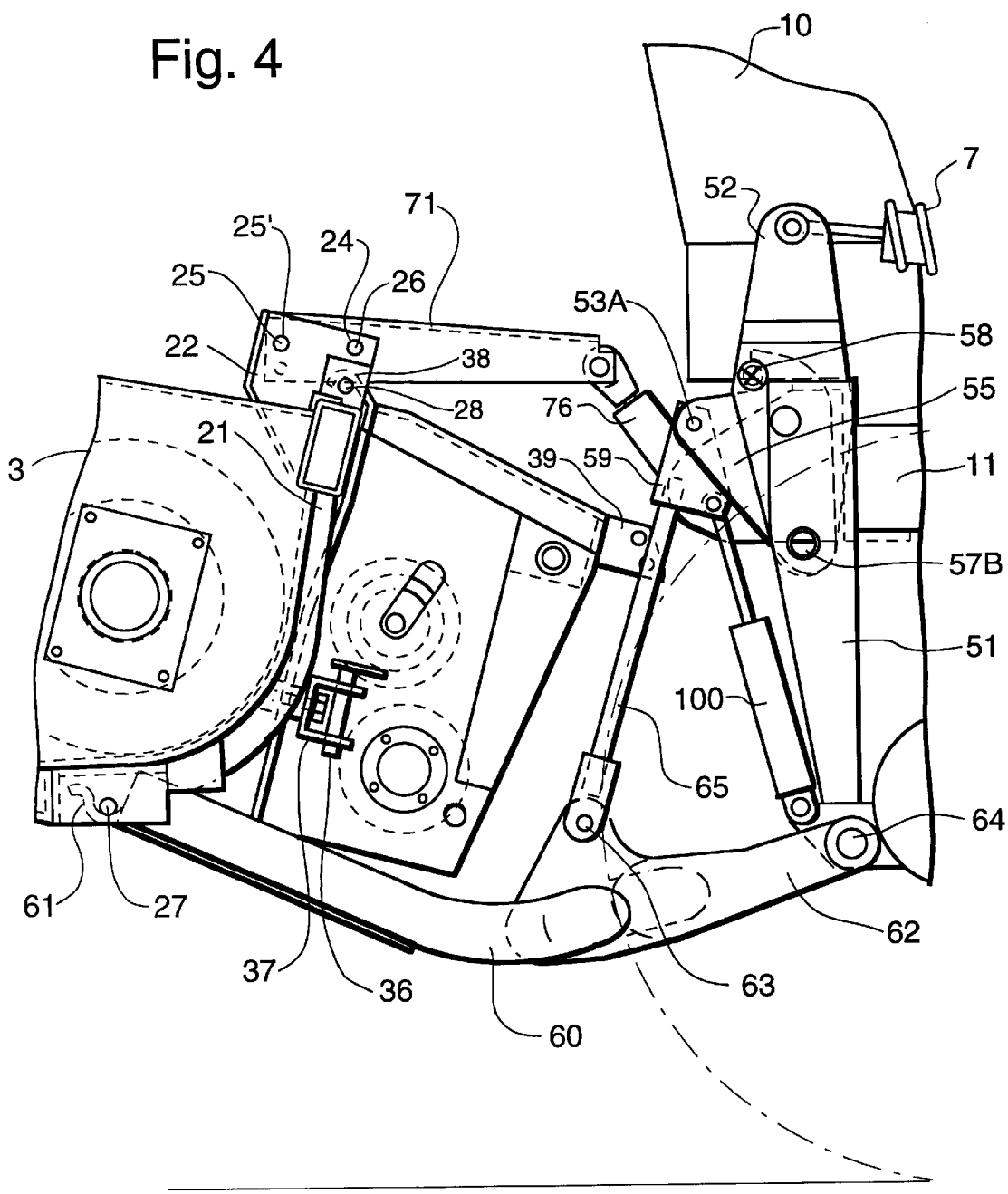
FIG. 4 is an enlarged fragmentary view of a portion of FIG. 2 that better shows the header removal linkage, mower assembly and conditioner assembly.

Supporting the mower assembly 20 and conditioner assembly 35 is a lift arm 60. At the tip of the lift arm 60 is a lift cradle 61. The opposite end the lift arm 60 is attached to the lift support 62. The lift support 62 is pivotally attached to the vehicle frame through the tractor pivot 64. Also pivotally attached to the vehicle frame is the hydraulic lift cylinder 100. To assist in the removal of the header 2, header removal linkage 50 is positioned above the lift support 62 and lift cylinder 100. As is illustrated in FIG. 4, 5 and 6, the header removal linkage 50 consists of a free link 52 pivotally attached at the B pivot 57 to the platform 11. Also pivotally attached to the free link 52 is the flotation spring 7. Within the free link 52 is the bell crank 55 that also pivots about the B pivot 57. The bell crank 55 has an A pivot 53 to which is pivotally attached the lift bracket 59. Affixed to the lift bracket 59 is the lift linkage 65. The lift linkage 65 is pivotally attached to the lift support 62 by the lift linkage pivot 63. Returning to the bell crank 55, there is a catch 56. Securing the bell crank 55 to the free link 52 is achieved by a lock out pin 58 inserted into the lock out socket 54. This forces the bell crank 55 and free link 52 to pivot as a single member about the B pivot 57. As seen in FIGS. 4 and 5, as the lift cylinder 100 is contracted, the bell crank 55 and free link 52 rotate about the B pivot 57 and also the flotation spring 52 extends. As seen in FIG. 6, when the lockout pin 58 is removed, the bell crank 55, only, rotates about the B pivot 57. This allows the flotation spring 7 to remain attached to the free link 52. The extension of the lift cylinder 100 allows the catch 56 to re-align with the lock out socket 54. At this point, the lock pin 58 can be re-inserted allowing the bell crank 55 and free link 52 to act as a single member and pivot about the B pivot 57. While the figure and the above discussion focuses on only one side of the header 2, one skilled in the art who recognize that a duplicate mechanism and method would exist on the opposite side of the header 2.

FIG. 4A illustrates a preferred embodiment of the header removal linkage. Specifically, the lift cylinder 100 is attached to the bell crank instead of the lift bracket. In this embodiment, the enlarged bell crank 55A is where the lift cylinder 100 is attached. The lift cylinder 100 is attached at the modified lift cylinder attach 100A. By attaching the lift cylinder 100 to the bell crank 100, alignment and stress problems are eliminated on the lift bracket 59. The reduced lift bracket 59A still has the lift linkage 65 attached. Another improvement is the addition of several lift linkage pivot adjustment apertures 63 on an alternate lift linkage 62A. These apertures allow the lift linkage 65 to be adjusted to accommodate different sized headers. The embodiment in FIG. 4A operates almost identical to the previously discussed embodiment. Specifically, the removal of the lockout pin 58 allows the bell lo crank 55 or enlarged bell crank 55A to operate independently from the free link 52.

Figure 11:
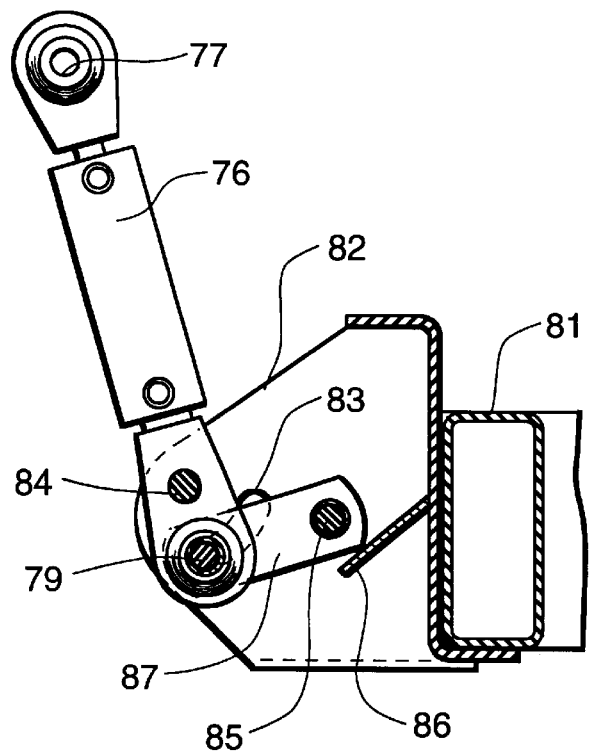
FIG. 11 is a vertical sectional view taken on the line 11—11 of FIG. 10 to better show the tilt cylinder, the floating link assembly and the removal pins in the storage position.
Figure 12:
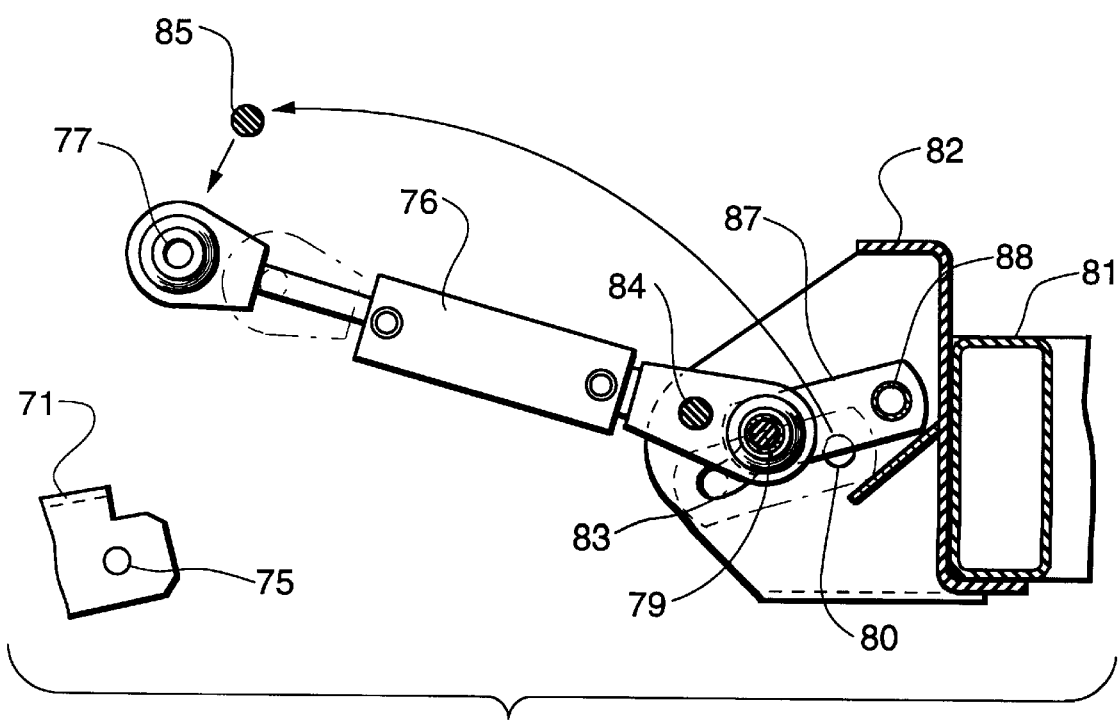
FIG. 12 is a view similar to FIG. 11, but with parts beginning an to attachment sequence. The tilt cylinder has been extended. The tractor has positioned the parts in the vicinity of the header top link to which the connection is intended. The second removal pin has been removed from its storage position in preparation for connecting the cylinder to the header top link. The tilt cylinder and floating link have pivoted about the other first removal pin as allowed and limited by the arcuate slot which carries a non-removable tractor pin.
Figure 13:
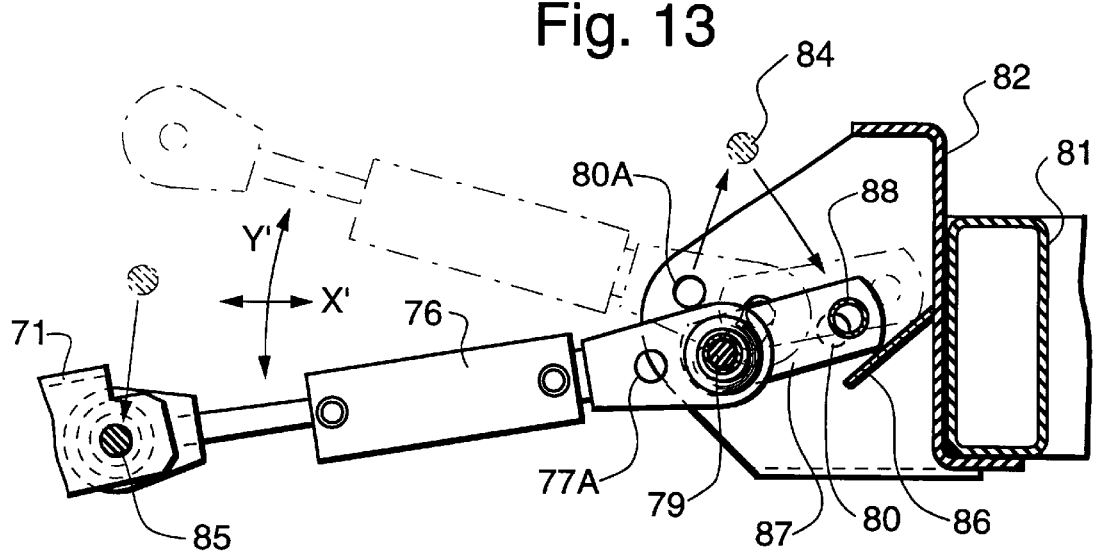
FIG. 13 shows the first removal pin after being removed allowing the tilt cylinder and floating link to be moved within the limits of the arcuate slot to align the tilt bracket and tilt pin slot to receive the first removal pin (which is shown in its connected position in solid lines).

Positioned at the center of the header 2 is the floating top link assembly 70. The assembly 70 has a header top link 71. The header top link has four apertures for receiving bolts or pins. These are the first bolt hole 72, the second bolt hole 73, third bolt hole 74 and the tilt cylinder attach 75. The bolt holes 72, 73 and 74 alternatively receive the first pin 25 and second pin 26. The tilt cylinder attach 75 usually receives the second removal pin 85, but it sometimes holds the first removal pin 84. As is illustrated in FIGS. 6 and 7, the header top link 71 can be connected either to the mower bracket 22 or conditioner bracket 39. When the header top link 71 is connected to the mower bracket 22, the first pin 25 is inserted into the first bolt hole 72 on the header top link 71 and the first mower socket 23. The second pin 26 is inserted into the second mower socket 24 and third bolt hole 74. When the header link 71 is attached to the conditioner bracket, the first pin 25 is inserted into the first conditioner socket 40 and first bolt hole 72. Likewise, the second pin 26 is inserted into the second bolt hole 75 and second conditioner socket 41. Besides the header top link 71, the assembly 70 has tilt cylinder 76 connecting the header top link 71 to the windrower. As seen in FIGS. 9 through 14, the tilt cylinder has several apertures for receiving pins. Specifically, as seen in FIG. 11, there is an implement pin aperture 77. At the opposite end of the cylinder (as seen in FIG. 13) there is a cylinder slot 77A. There is also a tilt bracket 87 having a tilt pin slot 88. Pivotally attaching the tilt cylinder 76 to the tractor frame is a tractor pin 79. The tractor pin 79 is slideably attached to the double-walled frame mounting bracket 86. This is achieved by positioning the tractor pin 79 in the arcuate slot 83. The frame mounting bracket 86 is affixed to the tractor frame 81. The bracket 86, besides being double walled and having an arcuate slot 83 has a second tractor pin slot 80A and a third tractor pin slot 80. Positioned between the two walls of the frame mounting bracket 86 is a sloped bracket 86. The tilt bracket 87 slideably contacts the sloped bracket 86. Depending on the desired header configuration a first removal pin 84 is inserted into the second tractor pin slot 80A and cylinder slot 77A or into the third tractor pin slot 80 or tilt pin slot 88. Also, the second removal pin can be inserted in the third tractor pin slot 80 and tilt pin slot 88.

Figure 17:
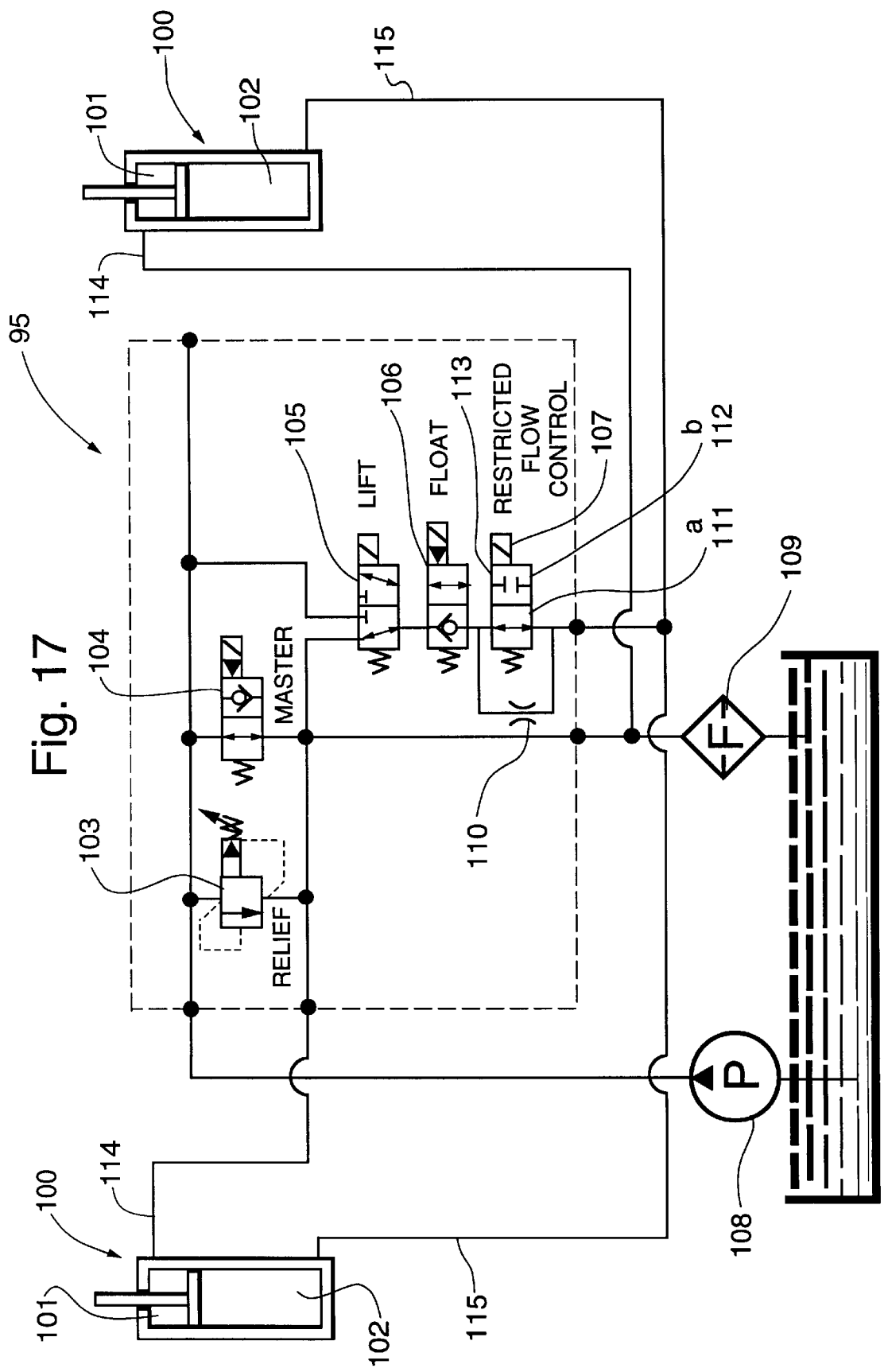
FIG. 17 is a hydraulic schematic of the header lift system with the restricted flow control valve that is operated by the switch seen in FIGS. 15 and 16.

There is also a header lift manifold 95. This lift manifold 95 prevents the header 2 from dropping to the ground when the lock pin 58 is removed from the bell crank 55 and free link 52. If the header 2 were to drop quickly to the ground, it might create a safety hazard to an operator or damage to the header. Also, the lift manifold 95 allows the operator to continue to be able to extend or retract the lift cylinders 100. This allows the operator to raise or lower the entire header, mower assembly or conditioner assembly. As seen in FIGS. 15 through 17, the lift manifold 95 uses a switch 96 activated by plunger 98 to control a solenoid 113 on a restricted flow control valve 107. While the switch 96 is a plunger-type switch, any micro-switch could be used. FIG. 17 illustrates a standard hydraulic circuit for a lift cylinder 100 in the un-powered state. With the exception of the restricted flow control valve 107 and orifice 110, this circuit is well known by those in the art. The conventional circuit consists of pump 108 connected to a relief valve 103, master valve 104, lift valve 105 and float valve 106. These valves control the direction and flow of hydraulic fluid into the rod or spool line 114 and piston line 115. The piston and spool lines 115 and 116, in turn, provide fluid into the piston end 102 and spool end 101 of the lift cylinder 100. The improvement consists of a two position, restricted control valve 107 moved from position A 111 to position B 112 by a solenoid 113. The solenoid 113 moves the valve 102 into position B 112 as long as the switch 96 is closed. When the switch is opened, the valve 107 moves to the A position 111. The removal of the lockout pin 58 will allow the valve 107 to remain in the A position (or free flow state). Recall that the removal of the lockout pin 58 allows only the bell crank 55 to move independently of the free link 52. Looking at FIGS. 16 and 17, the switch 96 only opens (and returns the valve 107 to the opened, A position or free float state) when the free link 52 for removing the header and frame bracket 51 separate which is when the header is lowered in normal operation. When the lockout pin 58 is removed for removing the header, the bell crank 55 separates from the free link 52. The switch 96 remains closed because the plate 97 and switch 96 are located on the free link 52 and frame bracket 51, respectively. When the switch is closed, the solenoid 113 is energized and the valve 107 is moved to the B position 112 and hydraulic fluid is prevented from passing through valve 107 and is forced through an orifice 110. This retards the motion of the lift cylinders 00 and allows the lift cylinders to function slowly. Connecting the switch to the solenoid 113 are a pair of wires 99.

The present invention allows for the greater ease of the removal of the conditioner assembly 35 and the attachment of the tilt cylinder 76 from a stowed position. Conversely, the conditioner assembly 35 can be easily re-attached and the tilt cylinder disconnected and stored. To remove the conditioner assembly 35 from a header 2 several steps are involved. First, remove the lockout pin 58 from the free link 52 and the bell crank 55. This allows the bell crank 55 to move about the B pivot 57. Second, remove the conditioner removal pin 36 from a conditioner pin carrying bracket 37 and insert the conditioner removal pin 36 into the conditioner pin socket 42. Third, remove the first pin 25 from the first mower socket 23 in the mower bracket 22 and the first bolt hole 72 in the header top link 71. Fourth, remove the second pin 26 from the second mower socket 24 in the mower bracket 22 and the third bolt hole 74 in the header top link 71. Fifth, insert the first pin 25 into the first conditioner socket 40 on the conditioner bracket 39 and the first bolt hole 72 in the header top link 71. Sixth, insert the second pin 26 into a second conditioner socket 41 in the conditioner bracket 39 and a second bolt hole 73 in the header top link 71. Seventh, move the lift cradle 61 on a lift arm 60 beneath the mower lift pin 27 to beneath the conditioner removal pin 36. Then, remove the conditioner mounting pin 43 from the conditioner mounting socket 44. Next, lift the conditioning hook 38 off of the mower pivot 28. Finally, move the conditioner assembly 35 away from the mower assembly 20 for storage.

Figure 14:
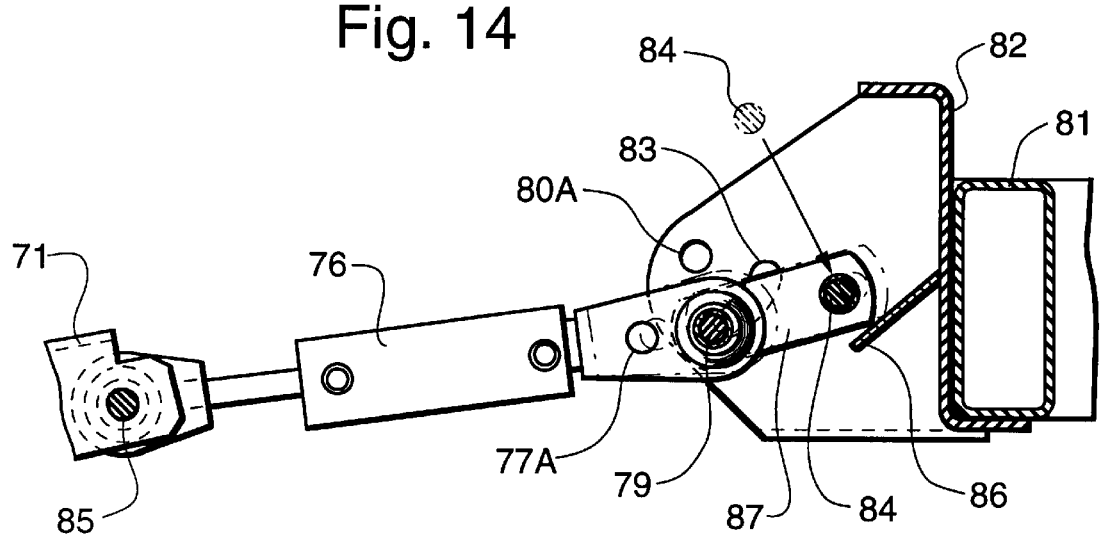
FIG. 14 shows the process after FIG. 13, the cylinder is retracted a little to pull the tractor pin to the bottom left of the arcuate slot. This drags the floating link to a position wherein the first removal pin can pass into the aligned holes in the tilt bracket and frame mounting bracket thereby locking the assembly into a fixed position.

If the tilt cylinder 76 is in the stowed or stored position as seen in FIG. 11, it can be re-attached to either header top link 76 by the following steps which can be seen in FIGS. 11 through 14. First remove the second removal pin 85 from the tilt pin slot 88 in the tilt bracket 87 and the third tractor pin slot 80 in a frame mounting bracket 82. Second, move the implement pin aperture 77 in the tilt cylinder 76 into alignment with the tilt cylinder attach 75 in the header top link 71. This alignment is accomplished by the tilt cylinder 76 rotating about the first removal pin 84 and the tractor pin 79 sliding upward in the arcuate slot 83 (as viewed in FIG. 12). The tilt bracket 87 slides up the sloped bracket 86. Third, insert the second removal pin 85 in the implement pin aperture 77 and the tilt cylinder attach 75. Next, remove the first removal pin 84 from the second tractor pin slot 80A in the frame mounting bracket 82 and the cylinder slot 77a in the tilt cylinder 76. Then, align the tilt pin slot 88 in the tilt bracket 87 and the third tractor pin slot 80. Alignment is achieved, as seen in FIGS. 13 and 14, by sliding the tractor pin 79 downwards in the arcuate slot 85 and the tilt bracket 87 downward the slope bracket 86. Finally, insert the first removal pin 84 in the tilt pin slot 88 and third tractor pin slot 80.

It will be obvious to those skilled in the art that various changes may be made without departing from the scope of the invention and the invention is not to be considered limited to what is illustrated in the drawings and described in the specification.

What is claimed is:

1. A header on a self-propelled windrower comprising:
   a. a lift arm controlled by a flotation spring and a lift cylinder;
   b. a mower assembly having a mower frame, said frame having a mower bracket, a mower lift pin and a mower pivot, said mower lift pin supported by the lift arm;
   c. a conditioner assembly affixed to the mower assembly by a conditioner hook connected to the mower pivot and by a condition mounting bolt, wherein the conditioner assembly further comprising:
      i. a conditioner pin carrying bracket,
      ii. a conditioner removal pin inserted in the bracket,
      iii. a conditioner pin socket for receiving the conditioner removal pin, said socket capable of supporting the conditioner assembly after receiving the conditioner removal pin, and
      iv. a conditioner bracket having a first conditioner socket and a second conditioner socket, and
   d. a header top link attached to the mower bracket and to a tilt cylinder.

2. The header described in claim 1 wherein the mower bracket further comprises a first mower socket and a second mower socket.

3. The header described in claim 2 wherein the header top link further comprises:
   a. a tilt cylinder attach, therein for pivotally attaching the tilt cylinder to the header top link;
   b. a first bolt hole, therein;
   c. a second bolt hole, therein;
   d. a third bolt hole, therein;
   e. a first pin; and f. a second pin, whereby the mower assembly can be manipulated by inserting the first pin into the first bolt hole and first mower socket and the second pin into the second mower socket and third bolt hole and whereby the conditioner assembly can be manipulated by inserting the first pin into the into the first bolt hole and first conditioner socket and the second pin into the third bolt hole and second mower socket.

4. The header described in claim 3 further comprising a header removal linkage attached to a platform and pivotally controlling the lift arm, said removal linkage pivotally attached to a flotation spring.

5. The header described in claim 4 wherein the header removal linkage further comprises:
   a. a frame bracket attached to the platform;
   b. a free link pivotally having a lockout socket, therein, said free link attached to the platform at an A pivot, said link controlled by a flotation spring;
   c. a lockout pin which is inserted into the lockout socket; and
   d. a bell crank pivotally attached to the free link at the A pivot and held in position by the lockout pin.

6. The header described in claim 5 wherein the bell crank further comprises a catch which contacts the lockout pin and a B pivot.

7. The header described in claim 6 further comprising:
   a. a lift bracket pivotally attached at the B pivot;
   b. a lift support pivotally attached to a vehicle frame and attached to the lift arm, said lift support having a lift linkage pivot adjustment aperture, therein;
   c. a lift linkage pivotally attached to the lift support at the lift linkage pivot aperture and attached to the lift bracket; and
   d. a lift cylinder pivotally attached to the vehicle frame and pivotally attached to the bell crank.

8. The header described in claim 7, wherein the lift arm further comprises a lift cradle which contacts the mower lift pin and conditioner removal pin.

9. The header described in claim 3 further comprising a floating top link assembly pivotally attached to the header top link and pivotally attached to a tractor frame.

10. The header described in claim 5 wherein the floating top link assembly further comprises:
    a. a frame mounting bracket affixed to the tractor frame; and
    b. a tilt cylinder pivotally attached to the frame mounting bracket and pivotally attached to the header top link.

11. The header described in claim 10, wherein the tilt cylinder further comprises:
    a. an implement pin aperture, therein;
    b. a second removal pin inserted into the implement pin aperture;
    c. a cylinder slot, therein;
    d. a tractor pin slideably and pivotally connected to the frame mounting bracket; and
    e. a tilt bracket having a tilt pin slot, therein.

12. The header described in claim 11 wherein the frame mounting bracket further comprises:
    a. an arcuate slot, therein, said slot for receiving the tractor pin;
    b. a second tractor pin slot, therein;
    c. a third tractor pin slot, therein;
    d. the tilt pin slot, therein;
    e. a first removal pin inserted in the third tractor pin slot and the tilt pin slot; and
    f. a sloped bracket for guiding the tilt bracket.

13. The header described in claim 5, further comprising a switch further comprising:
    a. a plate attached to the free link;
    b. a plunger attached to the frame bracket, said plunger located proximate to the plate; and
    c. a pair of wires for transmitting an electric signal to a solenoid.

14. The header described in claim 13 further comprising a hydraulic circuit for controlling the movement of the lift cylinder, said circuit further comprising:
    a. a pump for supplying hydraulic fluid to the lift cylinder;
    b. a relief valve, a master valve, a lift valve and a float valve for controlling the hydraulic fluid in a spool line and a piston line, said spool line and piston line connected to the lift cylinder;
    c. a restricted flow control valve; controlled by the solenoid and
    d. an orifice.

15. The header described in claim 14, wherein the restricted flow control valve further comprises a two position valve having a first position and a second position, said first position allowing an unrestricted flow of hydraulic fluid and the second position not allowing a flow of hydraulic flow.

16. The header described in claim 15 wherein the orifice receives the flow of hydraulic fluid when the restricted flow valve is in the second position.

17. The header described in claim 6, further comprising
    a. a lift bracket pivotally attached at the B pivot;
    b. a lift support pivotally attached to a vehicle frame and attached to the lift arm;
    c. a lift linkage pivotally attached to the lift support and attached to the lift bracket; and
    d. a lift cylinder pivotally attached to the vehicle frame and pivotally attached to the lift bracket.

18. A method for removing a conditioner assembly from a header on a self-propelled windrower comprising the steps of:
    a. removing a lockout pin from a free link and a bell crank;
    b. removing a conditioner removal pin from a conditioner pin carrying bracket;
    c. inserting a conditioner removal pin into a conditioner pin socket;
    d. removing a first pin from a first mower socket in a mower bracket and a first bolt hole in a header top link;
    e. removing a second pin from a second mower socket in the mower bracket and a third bolt hole in the header top link;
    f. inserting the first pin into a first conditioner socket on a conditioner bracket and the first bolt hole in the header top link;
    g. inserting the second pin into a second conditioner socket in the conditioner bracket and a second bolt hole in the header top link;
    h. moving a lift cradle on a lift arm beneath a mower lift pin to beneath the conditioner removal pin;
    i. removing a conditioner mounting pin from a conditioner mounting socket;
    j. lifting a conditioning hook off of a mower pivot; and
    h. moving the conditioner assembly from a mower assembly.

19. A method of attaching a tilt cylinder on a self propelled tractor frame to a header comprising the steps of:
   a. removing a second removal pin from a tilt pin slot in a tilt bracket and a third tractor pin slot in a frame mounting bracket;
   b. moving a implement pin aperture in the tilt cylinder into alignment with tilt cylinder attach in a header top link;
   c. inserting the second removal pin in the implement pin aperture and the tilt cylinder attach;
   d. removing a first removal pin from a second tractor pin slot in the frame mounting bracket and a cylinder slot in the tilt cylinder;
   e. aligning the tilt pin slot in the tilt bracket and the third tractor pin slot; and
   f. inserting the first removal pin in the tilt pin slot and third tractor pin slot.

* * * * *